K. O. MUEHLBERG.
TUBE COUPLING.
APPLICATION FILED MAY 11, 1917.
1,296,103.
Patented Mar. 4, 1919.
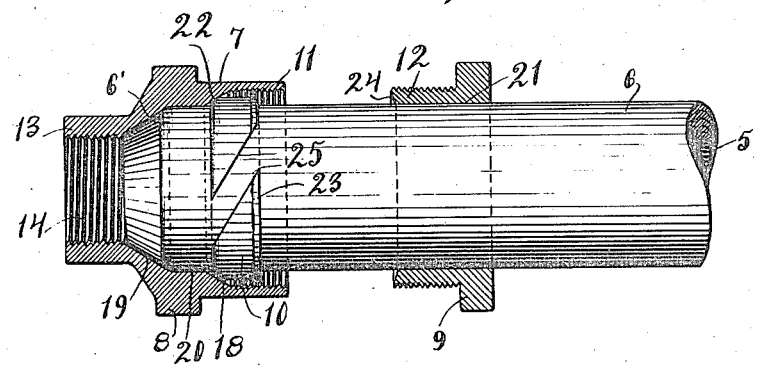
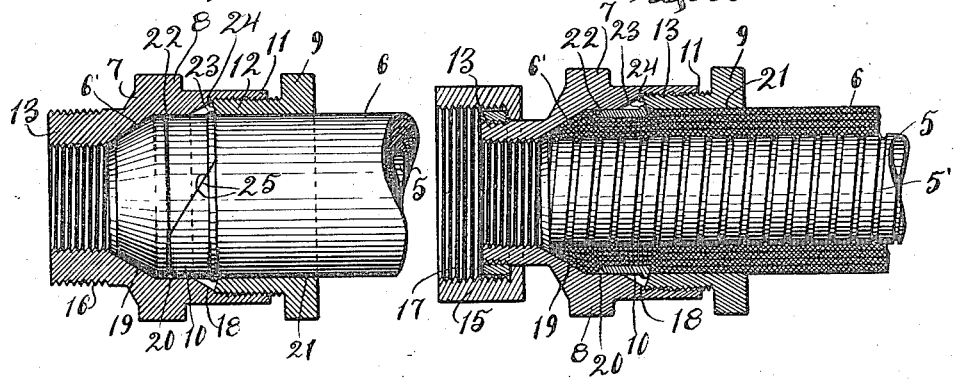
INVENTOR
Karl O. Muehlberg
By Morsell, Keeney & French
ATTORNEYS.

UNITED STATES PATENT OFFICE.

KARL O. MUEHLBERG, OF MANITOWOC, WISCONSIN.

TUBE-COUPLING.

1,296,103.

Specification of Letters Patent. Patented Mar. 4, 1919.

Application filed May 11, 1917. Serial No. 168,003.

*To all whom it may concern:*

Be it known that I, KARL O. MUEHLBERG, a citizen of the United States, and resident of Manitowoc, in the county of Manitowoc and State of Wisconsin, have invented new and useful Improvements in Tube-Couplings, of which the following is a description, reference being had to the accompanying drawings, which are a part of this specification.

This invention relates to improvements in tube coupling more particularly adapted for connecting flexible tubes to a coupling member.

Flexible metal tubes used for gasolene and other fluids are usually formed of an interlocked spirally trending strip of metal covered with woven layers of fabric, some of the layers of which are coated with a gelatinous composition. Heretofore it has been found very difficult to satisfactorily attach metal coupling members to the ends of tubes of this type and form a fluid tight connection due to the yielding nature of and the covering material of the tube and also due to the fact that the tube ends are usually cemented to the metal coupling members and the cement ofttimes breaks away from the parts. Furthermore when the parts are connected together they are not held sufficiently firm to withstand the pulling strain which they are often subjected to while in use.

It is one of the objects of the present invention to overcome the before mentioned objectionable features and provide a tube coupling member which may be firmly and positively connected to a flexible metal tube in such a manner as to form a fluid tight joint without the use of cement or other adhesive material.

A further object of the invention is to provide a tube coupling which may be easily and removably attached to a flexible metal tube end and which will serve as part of a coupling union or as a means for a threaded pipe connection.

A further object of the invention is to provide a tube coupling in which the bore of the coupling member is as large as the bore of the flexible tube to provide an unrestricted opening therethrough.

A further object of the invention is to provide a tube coupling in which the fabric or other material covering the metal portion of the flexible tube is also used as a packing for sealing the joint between the tube and the coupling member.

A further object of the invention is to provide a tube coupling in which a clamping member is automatically embedded into the covering material of the flexible tube when portions of the coupling member are threaded together while surrounding the flexible tube.

A further object of the invention is to provide a tube coupling which is of simple construction, is strong and durable and is well adapted for the purpose described.

With the above and other objects in view the invention consists of the improved tube coupling and its parts and combinations as set forth in the claims, and all equivalents thereof.

In the accompanying drawing in which the same reference characters indicate the same parts in all of the views:

Figure 1 is a side view of a flexible metal tube and showing the improved coupling member positioned thereon before being completely assembled, the said member being shown partly in section;

Fig. 2 is a similar view with the parts assembled in clamping position; and

Fig. 3 is a longitudinal sectional view of the coupling member and a portion of the flexible metal tube, the view also showing a coupling nut mounted upon the outer end of the member for connecting the member to the threaded end of another member to form a union therebetween.

Referring to the drawing the numeral 5 indicates an end piece of spirally wound flexible metal tubing, 6 the outer cover of fabric and other material and 7 the improved coupling member therefor. The flexible metal tubing in the course of manufacture forms a spirally trending groove 5' between its convolutions which is entered by the covering material 6 the parts being thus securely bound together. The improved coupling member 7 comprises the outer coupling member 8, the inner coupling member 9 and the split annular clamping member 10 which is interposed between the outer and the inner members.

The outer coupling member is of tubular form with its inner end 11 interiorly threaded for a portion of the length of the bore to receive the threaded end 12 of the inner member 9, and the opposite end 13 of the said outer member is also interiorly threaded, as indicated by the numeral 14, for a portion of the length of the bore to permit the said member being threaded to a pipe. When it is desired to connect two of the members together to form a union the outer end of one of the members is provided with a union nut 15 as shown in Fig. 3 and another member is provided with an exterior thread 16, as in Fig. 2, which is engaged by the thread of the union nut to tightly clamp the two parts together. The union nut 15 is loosely mounted on the end of the said member and is held loosely in position by a ring nut 17 threaded on the end of the said member. The threaded portion 14 of the outer end of the outer coupling member is of less diameter than the threaded portion of the inner end 11 of said member and between the inner ends of said threads the bore is tapered outwardly at two points as indicated by 18 and 19 and at a point 20 between the tapered portions the bore is straight for a short distance. The larger tapered portion 18 is engaged by the split clamping member 10 and the smaller tapered portion 19 is engaged by the forward end portion 6' of the flexible tube when the coupling member is attached to the flexible tube. The straight portion 20 of the bore of the outer member and the bore 21 of the inner coupling member are approximately of the same diameter as the flexible tube to which it is adapted to be connected so that they may be easily slipped over the end of the flexible tube.

The split annular clamping member 10 when in expanded or in open position may be easily slipped over the end of the flexible tube and is of a diameter to easily enter the outer coupling member to a point where its forward rounded or beveled peripheral edge 22 will engage the larger tapered portion 18 of the outer coupling member. The rear portion of the clamping member 10 is reinforced by a rounded peripheral flange 23 which is engaged by the forward inwardly beveled edge 24 of the inner coupling member 9.

The clamping member is split diagonally to form edgewise overlapping ends and the angular ends 25 are so spaced that when the member is in closed or contracted position the ends will abut against each other and the outer diameter of the clamping member, with the exception of the peripheral flange will correspond to the diameter of the straight part 20 of the interior portion of the outer coupling member.

In use the inner coupling member and the split clamping member are slipped over the end of the flexible tube and the tube end is then inserted into the outer member with its end bearing against the end of the taper of greater diameter. The inner coupling member is now threaded into the outer member and in so threading the split member will be forced toward the straight portion of the bore and at the same time contracted and embedded into the yielding material of the tube covering. As the clamping member is contracted it will at the same time advance and will force the tube end tightly against the tapered portion of the outer coupling member of less diameter and seal the joint between the tube end and the outer coupling member.

When the split member enters the straight portion of the outer member it will be entirely closed and embedded in the tube but will continue to force the end of the tube more tightly against the tapered wall and form a liquid tight closure therebetween. The engagement of the split ring with the straight wall also serves to prevent the split ring bending at an angle and relieves the inner coupling member of the strain present while forcing said member against the beveled wall.

From the foregoing description it will be seen that the tube coupling may be easily and removably connected to a flexible tube, it will also be seen that it is of very simple construction and is well adapted for the purpose described.

What I claim as my invention is:

1. A tube coupling, comprising an outer tubular member having a bore with a plurality of tapered portions, one of said portions being of less diameter than the other, a split annular clamping member adapted to be positioned within the outer member and engage the tapered portion of larger diameter, said tapered portion of smaller diameter adapted to be engaged by the end of the tube upon which the coupling is mounted, and an inner tubular member adapted to enter and have a threaded engagement with the outer member and engage and force the split member to a clamping contracted position.

2. A tube coupling, comprising an outer tubular member having a bore with two spaced tapered portions of different diameters, a split annular clamping member adapted to be positioned within the outer member and engage the tapered portion of larger diameter, said tapered portion of smaller diameter adapted to be engaged by the end of the tube upon which the coupling is mounted, and an inner tubular member adapted to enter and have a threaded engagement with the outer member and engage and force the split member to a clamping contracted position and into the portion of the bore of the outer member between the tapered portions.

3. A tube coupling, comprising an outer tubular member having a bore with two spaced tapered portions of different diameters, a diagonally split annular clamping member adapted to be positioned within the outer member and engage the tapered portion of larger diameter, said tapered portion of smaller diameter adapted to be engaged by the end of the tube upon which the coupling is mounted, and an inner tubular member adapted to enter and have a threaded engagement with the outer member and engage and force the split member to a clamping contracted portion and into the portion of the bore of the outer member between the tapered portions.

4. A tube coupling, comprising an outer tubular member having a bore with two spaced tapered portions of different diameters, a diagonally split annular clamping member adapted to be positioned within the outer member and engage the tapered portion of larger diameter, said tapered portion of smaller diameter adapted to be engaged by the end of the tube upon which the coupling is mounted and an inner tubular member adapted to enter and have a threaded engagement with the outer member and engage and force the split member to a clamping contracted position and into the portion of the bore of the outer member between the tapered portions, the bore of the inner member and the portion of the bore of the outer member between the tapered portions of the bore of said outer member being of the same diameter as the outer diameter of the major portion of the split member when said split member is in contracted position.

5. The combination of a flexible metal tube having a yielding covering, of a coupling means therefor, comprising an outer tubular member mounted on the tube and having a bore with two spaced tapered portions of different diameters, a split annular clamping member adapted to surround the flexible tube and extend into and have a threaded engagement with the outer member, the forward edge portion of the split member engaging the tapered portion of larger diameter, the tapered portion of smaller diameter being engaged by the end of the yielding covering of the flexible tube, and an inner tubular member adapted to surround the flexible tube and entering and having a threaded engagement with the outer member and engage and force the split member to clampingly embed into the yielding covering of the flexible tube and to advance and force the end of said tube into intimate engagement with the tapered portion of less diameter and to also force the split member into the portion of the bore between the tapered portions thereof.

In testimony whereof, I affix my signature.

KARL O. MUEHLBERG.